Feb. 4, 1964  J. C. SWEENEY  3,120,134
ROTARY INDEX TABLE
Filed Nov. 21, 1960  3 Sheets-Sheet 1
FIG.1.
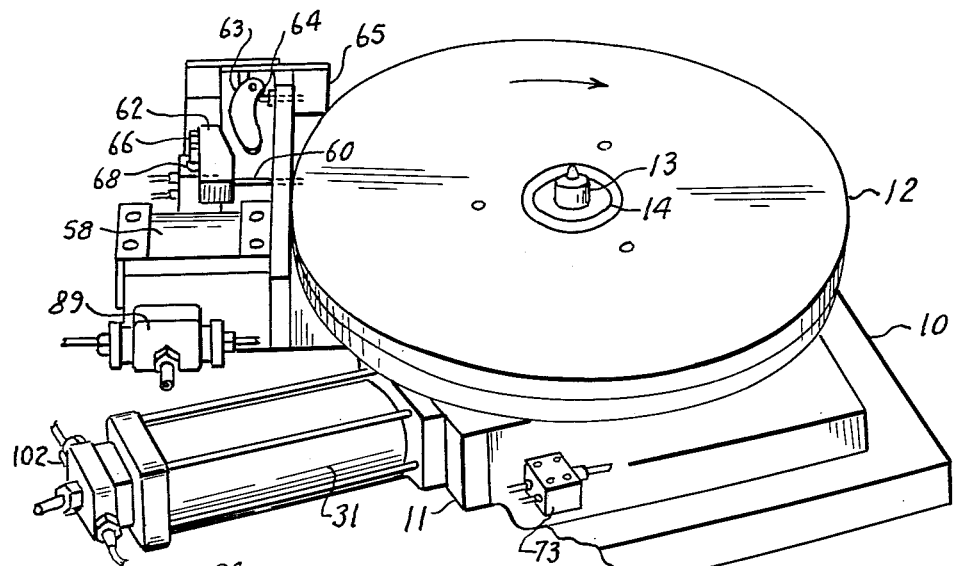
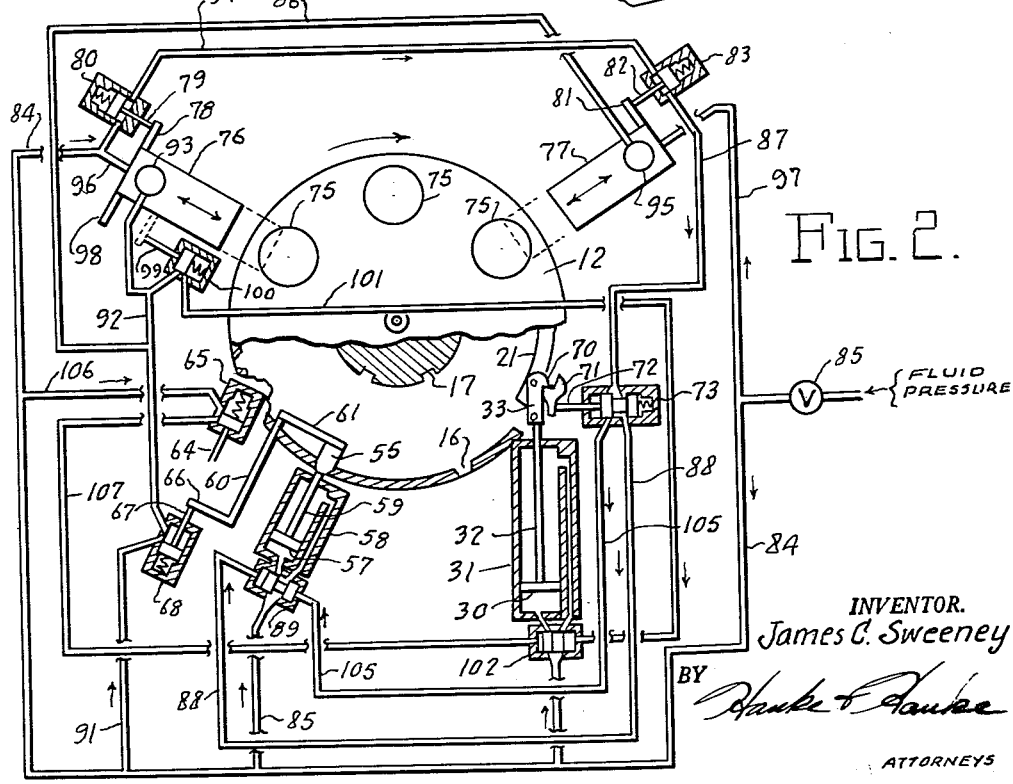
FIG.2.
INVENTOR.
James C. Sweeney
BY
Hauke & Hauke
ATTORNEYS Feb. 4, 1964 J. C. SWEENEY 3,120,134
ROTARY INDEX TABLE
Filed Nov. 21, 1960 3 Sheets-Sheet 2
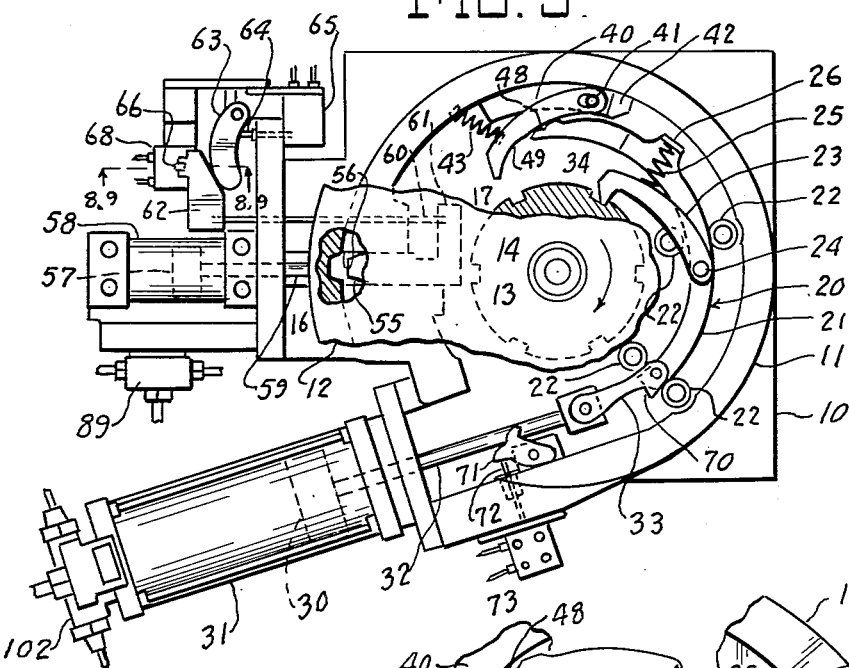
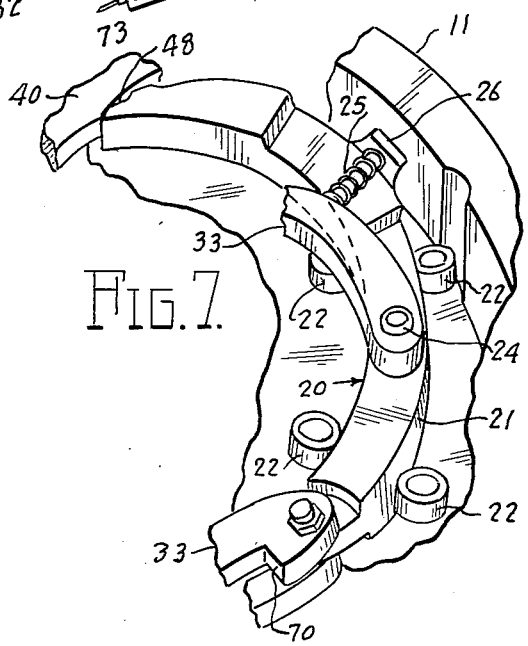
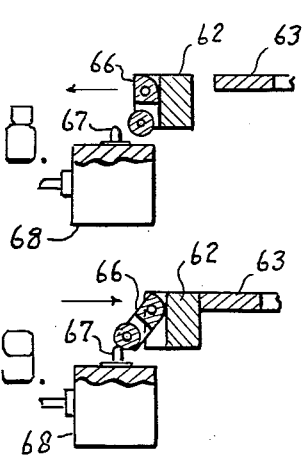
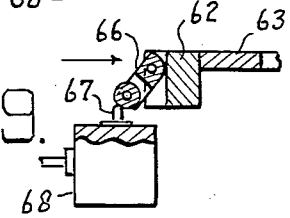
INVENTOR.
James C. Sweeney
BY
ATTORNEYS Feb. 4, 1964 J. C. SWEENEY 3,120,134
ROTARY INDEX TABLE
Filed Nov. 21, 1960 3 Sheets-Sheet 3
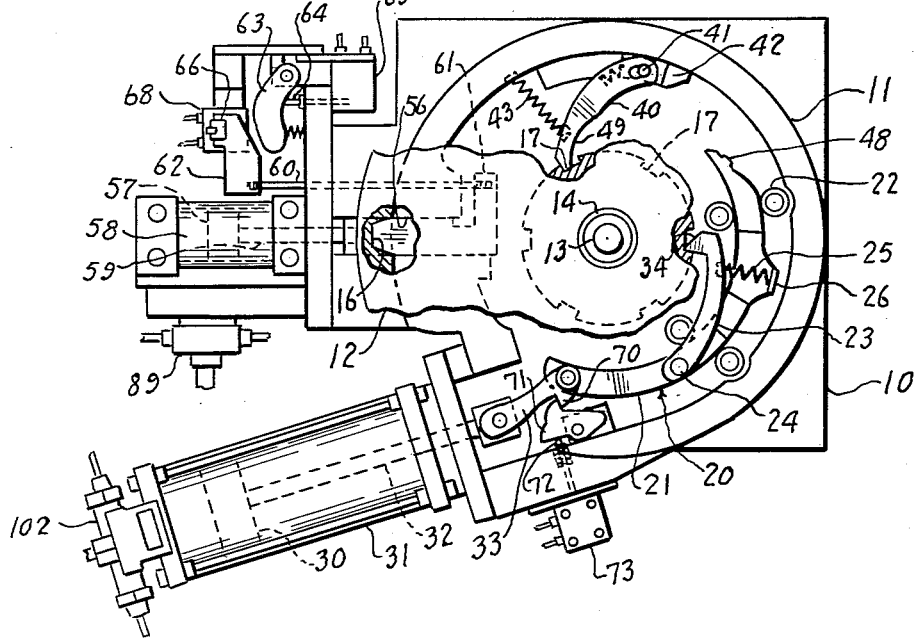
FIG. 4.
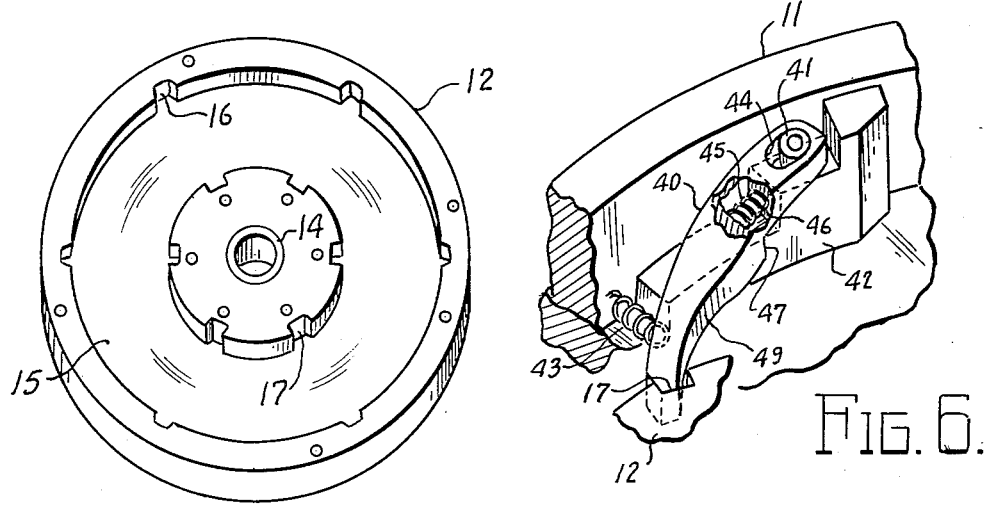
FIG. 5.
FIG. 6.
INVENTOR.
James C. Sweeney
BY
Hauke & Hauke
ATTORNEYS United States Patent Office 3,120,134
Patented Feb. 4, 1964

3,120,134
ROTARY INDEX TABLE
James C. Sweeney, West Bloomfield, Mich.
(5493 Middlebelt Road, Rte. 2, Orchard Lake, Mich.)
Filed Nov. 21, 1960, Ser. No. 70,558
10 Claims. (Cl. 74—823)

My invention relates to rotary index tables and more particularly to an improved index table construction and a system for operating same.

Rotary index tables are in considerable use today due to needs of automatic production methods. However, the mechanisms in such tables heretofore developed are either complex and prone to malfunctions or subject to damage from the high loads and strains imposed by sudden shifting of the relatively heavy table top from one position to the next. Moreover, wear on the mechanism which is needed to lock the table in successive positions eventually results in loose fitting of parts such that positive and accurate index positioning will become impossible and/or vibrations will occur when machining or other operations are being performed on a workpiece mounted on the table top, resulting in poor quality and excessive rejections and scrap.

An object of the present invention is to improve rotary index tables by providing more substantial and simplified indexing and locking mechanisms and operating systems.

Another object of the invention is to lengthen the life of rotary index tables by providing mechanism operable to take excessive loads off the body mechanism.

A further object of the invention is to improve index tables by providing means for absorbing shocks of suddenly stopping the table top when indexed to successive positions.

Still another object of the invention is to facilitate manufacture, assembly and maintenance on rotary index tables by providing simplified mechanisms to which access is readily attained.

For a more complete understanding of the invention, reference may be had to the accompanying drawings illustrating a preferred embodiment of the invention in which like reference characters refer to like parts throughout the several views and in which FIG. 1 is a perspective view of the preferred rotary index table assembly.

FIG. 2 is a diagrammatic view of the assembly and a preferred fluid pressure system operating and coordinating the mechanisms.

FIG. 3 is a plan view of the assembly partially broken away and in section.

FIG. 4 is a plan view similar to FIG. 3 but illustrating the mechanism in another position.

FIG. 5 is a perspective view showing the inner or under side of the table top.

FIGS. 6 and 7 are enlarged fragmentary perspective views of mechanisms in the assembly, and FIGS. 8 and 9 are cross-sectional views of mechanism in different positions, taken substantially on the line 8, 9—8, 9 of FIG. 3.

The rotary index table assembly as a whole is illustrated in FIG. 1 as comprising a base support 10 on which a housing 11 is mounted. A circular table top 12 is rotatably carried on a post 13 mounted in the center of the housing 11 by any means such as a bearing 14.

The table top 12, as shown in the bottom view of FIG. 5, has an annular recess 15, the outer periphery of which is provided with a plurality of equally spaced keeper slots 16, and the inner periphery of which is provided with a similar number of equally spaced indexing slots 17.

The table top 12 is rotated to successive positions in one direction only by means of an indexing mechanism 20, shown in FIGS. 3, 4 and 7 as comprising an arcuate arm 21 guided for extension and retraction in an arc concentric with the axis of table top rotation by any means such as rollers 22 bearing mounted inside the housing 11. An actuating arm 23 is pivotally carried by a pin 24 on the arcuate arm 21 and is urged inwardly by any means such as a spring 25 which is under compression and disposed between the actuating arm 23 and a flange 26 provided on the arcuate arm 21.

A piston 30, operating in a fluid pressure cylinder 31, is connected with the arcuate arm 21 by a piston rod 32 and a pivot link 33, so that axial operation of the piston 30 produces arcuate extension and retraction of the arcuate arm 21, as illustrated by the two positions of FIG. 3 and FIG. 4. On extension, a finger 34 on the end of the actuating arm 21 will engage one of the indexing slots 17 of the table top 12, and on retraction will rotate the table clockwise to a new position. When next the arcuate arm is extended (the table 12 being locked as will be described), the finger 34, due to its beveled outer end, will disengage from the first slot 17 and ride the inner periphery of the table top recess to the next indexing slot 17.

Inasmuch as the table top 12 is rotated rapidly and is relatively massive, it has a tendency to spin past its new position. To prevent this, a stop arm 40 is pivotally mounted on a pin 41 secured to a stepped block 42 within the housing, as shown in FIGS. 3, 4 and 6. A spring 43 or other means is disposed under compression between the stop arm 40 and an inside wall of the housing 11, urging the stop arm 40 inwardly so that its end rides along the inner periphery of the table top recess as the table top is rotated, but drops into one of the slots 17 when the table top reaches the new position, halting its rotation. The stop arm 40 is provided with a slot 44 through which the pin 41 extends, to permit a slight retraction of the stop arm 40 when it hits the edge of the slot 17, and the shock of stopping the table top 12 is substantially absorbed by means of a spring 45 compressed between a shoulder 46 of the stepped block 42 and a shoulder 47 provided on the stop arm 40, all as shown in FIG. 6.

The arcuate arm 21 is provided at its end with a cam portion 48 which, when the arm 21 extends, engages a cam portion 49 of the stop arm 40 and disengages same from the slot 17 against the compression of the spring 43, as shown in FIG. 3. On being so disengaged, the arm 40 will be extended by the spring 45 so that when the arcuate arm 21 begins retracting, the end of the stop arm 40 can not again engage in the same slot 17.

A locking member 55 is slidably carried in a radial groove 56 provided in the housing 11 and is actuated, by the system to be described, at the moment the table reaches its new position to move radially outward and engage with one of the keeper slots 16 provided in the outer periphery of the table top recess 15.

A piston 57, operable in a fluid pressure actuated cylinder 58 is directly connected to the locking member 55 through a piston rod 59. A valve actuating rod 60, secured to a flange 61 on the locking member 55, extends through the housing 11 and has on its outer end a cam assembly 62 which, when the locking member 55 is disengaged from the slot 16 as in FIG. 3, engages a lever 63 to actuate the control pin 64 of a valve 65. A lever 66, pivotally mounted on the cam assembly 62, engages and actuates the control pin 67 of a valve 68 only when the locking member 55 is engaging with the slot 16. As shown in FIGS. 8 and 9, this movement is toward the left. On movement toward the right, the lever 66 tips up and rides over the valve pin 67.

When the arcuate arm 21 is retracted, as seen in FIG. 4, a finger 70 on the link 33 engages with and pivots a lever 71 which actuates the control pin 72 of a valve 73.

A preferred fluid pressure system for operating and coordinating the various mechanisms is illustrated in FIG. 2, in which are indicated spaced workpieces 75 mounted on the table top 12 and tools 76 and 77 at two separated stations, said tools being operable to be extended inward to perform machine operations on the workpieces 75. The tool 76 includes means such as a flange 78 which engages the operating pin 79 of a valve 80 to open same only when the tool 76 is retracted. Tool 77 has a similar means such as a flange 81 which engages the operating pin 82 of a similar valve 83 to open same only when the tool 77 is retracted. Fluid pressure being directed to the valve 80 through a conduit 84 when the main valve 85 is opened, the valve will pass pressure only when the tool 76 is retracted, through conduit 86 to the valve 83, which will pass pressure only when the tool 77 is retracted, through a conduit 87 to the valve 73.

The valve 73 is preferably a two position shuttle valve which, when the pin 72 is actuated on retraction of the arcuate arm 21, passes pressure through a conduit 88 to the left side of a control valve 89 mounted on the cylinder 58. The control valve 89 is preferably a two position shuttle valve which is thus shifted to pass pressure from the pressure conduit 84 and conduit 90 to the side of the cylinder retracting the piston 59 to engage the locking member 55 in the table top slot 16 as shown. Thus, each time the arcuate arm 21 retracts, shifting the table top 12 to a new position, the locking member 55 will be operated to positively lock the table top 12 in such position.

On locking, the cam assembly arm 66 actuates the valve 68, opening same to pass pressure from conduit 84 and conduit 91 through a conduit 92 to a tool operating valve 93 on the tool 76 and through a conduit 94 to a tool operating valve 95 on the tool 77. The tools will then be operated by fluid pressure from conduits 96 and 97 respectively to move inward and perform machine operation on the workpieces 75. When the tool 76 moves in, another flange 98 will engage the operating pin 99 of a valve 100 to open same and pass pressure through a conduit 101 to a valve 102 mounted on the cylinder 31.

The valve 102 is preferably a two position shuttle valve which is thus shifted to the left to pass pressure to the side of the cylinder extending the piston 30, moving the arcuate arm 21 counterclockwise to engage the actuating arm 23 with the next slot 17 of the table top 12 and disengage the stop 40, as shown in FIG. 3.

When the finger 70 of the link 33 moves away from the lever 71, the shuttle valve 73 will actuate to the left. However, since the tools 76 and 77 are extended, the respective valves 80 and 83 will be closed so that the fluid pressure is blocked from the valve 73. Only when the tools are retracted will the valves 80 and 83 be opened to pass pressure to the valve 73 which now passes pressure through a conduit 105 to the other side of the shuttle valve 89, shifting same to the left to direct pressure to the other end of the cylinder 58 to extend the piston 57 and disengage the locking member 55 from the table top slot 16. Only when so unlocked will the cam assembly 66 actuate the pin 64 of the valve 65, opening same to direct pressure from conduit 84 and conduit 106 through a conduit 107 to the left side of the shuttle valve 102, shifting same to the right to direct pressure to the end of the cylinder retracting the piston 30 and the arcuate arm 21 to rotate the table top 12 clockwise to its next successive position, at which point the finger 70 of the link 33 will engage the lever 71, actuating the shuttle valve once more to the right, and the complete cycle will begin again.

In sequence, then, it will be seen that the table top 12 will be turned to a new position, the locking member 55 will then and only then engage a slot 16, the tools will thereupon be extended, the arcuate arm 21 will be extended to engage the next slot 17, the tools next will retract, the locking member 55 will disengage, and the table top is then and only then rotated to its next successive position.

Although I have described only one preferred embodiment of my invention, it will be apparent to one skilled in the art to which the invention pertains that various changes and modifications may be made therein without departing from the spirit of the invention or the scope of the appended claims.

I claim:

1. A rotary index table mechanism comprising
   (a) support,
   (b) a table rotatably carried by said support and having a plurality of annularly spaced indexing slots disposed at equal radii from the axis of table rotation,
   (c) an arcuate arm movably carried by said support,
   (d) means guiding said arm for movement in an arc concentric with said axis of table rotation,
   (e) actuating means arcuately reciprocating said arm,
   (f) means carried by said arm and operably engageable with said table whereby to rotate said table to successive working positions,
   (g) said table having a plurality of annularly spaced keeper slots disposed at equal radii from the axis of table rotation,
   (h) a locking element movably carried by said support,
   (i) actuating means intermittently operating said locking element to engage same with successive keeper slots to lock said table in said successive working positions,
   (j) means coacting with both of said actuating means and operable to effect disengagement of said locking element prior to each rotating movement of said table and to effect engagement of said locking element after each rotating movement of said table,
   (k) a stop element carried by said support,
   (l) means resiliently urging said stop element into one of said indexing slots on each rotating movement of said table to stop said table movement, and
   (m) means carried by said arcuate arm and releasing said stop element from said indexing slot subsequent to each engagement of said locking element with said keeper slots.

2. A rotary index table mechanism comprising
   (a) a support,
   (b) a table rotatably carried by said support and having a plurality of annularly spaced indexing slots disposed at equal radii from the axis of table rotation,
   (c) an arcuate arm movably carried by said support,
   (d) means guiding said arm for movement in an arc concentric with said axis of table rotation,
   (e) actuating means arcuately reciprocating said arm,
   (f) means carried by said arm and operably engageable with said table whereby to rotate said table to successive working positions,
   (g) said table having a plurality of annularly spaced keeper slots disposed at equal radii from the axis of table rotation,
   (h) a locking element movably carried by said support,
   (i) actuating means intermittently operating said locking element to engage same with successive keeper slots to lock said table in said successive working positions,
   (j) means coacting with both of said actuating means and operable to effect disengagement of said locking element prior to each rotating movement of said table and to effect engagement of said locking element after each rotating movement of said table,
   (k) a stop element carried by said support,
   (l) means resiliently urging said stop element into one of said indexing slots on each rotating movement of said table to stop said table movement,
   (m) means provided on said arcuate arm and releasing said stop element from said indexing slot subsequent to each engagement of said locking element with said keeper, and (n) said stop element being provided with resilient shock absorbing means for absorbing the shock effected on stopping movement of said table.

3. A rotary index table mechanism comprising (a) a support, (b) a table rotatably carried by said support and having a plurality of annularly spaced indexing slots disposed at equal radii from the axis of table rotation, (c) an arcuate arm movably carried by said support, (d) means guiding said arm for movement in an arc concentric with said axis of table rotation, (e) actuating means arcuately reciprocating said arm, (f) means carried by said arm and operably engageable with said table whereby to rotate said table to successive working positions, (g) said table having a plurality of annularly spaced keeper slots disposed at equal radii from the axis of table rotation, (h) a locking element movably carried by said support, (i) actuating means intermittently operating said locking element to engage same with successive keeper slots to lock said table in said successive working positions, (j) means coacting with both of said actuating means and operable to effect disengagement of said locking element prior to each rotating movement of said table and to effect engagement of said locking element after each rotating movement of said table, (k) a stop element carried by said support, (l) means resiliently urging said stop element into one of said indexing slots on each rotating movement of said table to stop said table movement, (m) means provided on said arcuate arm and releasing said stop element from said indexing slot subsequent to each engagement of said locking element with said keeper, (n) said stop element being provided with resilient shock absorbing means for absorbing the shock effected on stopping movement of said table, and (o) said first mentioned actuating means comprising a linearly movable actuator carried by said support, means moving said actuator in opposite axial directions, and a link operably connecting said actuator and said arm for arcuately moving same by linear movement of said actuator.

4. A rotary index table mechanism comprising (a) a support, (b) a table rotatably carried by said support and having a plurality of annularly spaced indexing slots disposed at equal radii from the axis of table rotation, (c) an arcuate arm movably carried by said support, (d) means guiding said arm for movement in an arc concentric with said axis of table rotation, (e) actuating means arcuately reciprocating said arm, (f) means carried by said arm and operably engageable with said table whereby to rotate said table to successive working positions, (g) said table having a plurality of annularly spaced keeper slots disposed at equal radii from the axis of table rotation, (h) a locking element movably carried by said support, (i) actuating means intermittently operating said locking element to engage same with successive keeper slots to lock said table in said successive working positions, (j) means coacting with both of said actuating means and operable to effect disengagement of said locking element prior to each rotating movement of said table and to effect engagement of said locking element after each rotating movement of said table, (k) a stop element carried by said support, (l) means resiliently urging said stop element into one of said indexing slots on each rotating movement of said table to stop said table movement, (m) means provided on said arcuate arm and releasing said stop element from said indexing slot subsequent to each engagement of said locking element with said keeper, (n) said stop element being provided with resilient shock absorbing means for absorbing the shock effected on stopping movement of said table, and (o) said coacting means comprising control means operating said first mentioned actuating means, a second control means operating said second mentioned actuating means, said second control means initially operating said second mentioned actuating means to disengage said locking element from said keeper slot, means operably connecting said first control means with said locking element only when same is disengaged to effect operating of said first mentioned actuating means to rotate said table to a next successive working position, and means operably connecting said first control means with said arcuate arm only when same has completed moving of said table to effect operating of said second mentioned actuating means to engage said locking element with the next successive keeper slot.

5. A rotary index table mechanism comprising (a) a support, (b) a table rotatably carried by said support and having a plurality of annularly spaced indexing slots disposed at equal radii from the axis of table rotation, (c) an arcuate arm movably carried by said support, (d) means guiding said arm for movement in an arc concentric with said axis of table rotation, (e) actuating means arcuately reciprocating said arm, (f) means carried by said arm and operably engageable with said table whereby to rotate said table to successive working positions, (g) said table having a plurality of annularly spaced keeper slots disposed at equal radii from the axis of table rotation, (h) a locking element movably carried by said support, (i) actuating means intermittently operating said locking element to engage same with successive keeper slots to lock said table in said successive working positions, (j) means coacting with both of said actuating means and operable to effect disengagement of said locking element prior to each rotating movement of said table and to effect engagement of said locking element after each rotating movement of said table, (k) a stop element carried by said support, (l) means resiliently urging said stop element into one of said indexing slots on each rotating movement of said table to stop said table movement, (m) means provided on said arcuate arm and releasing said stop element from said indexinug slot subsequent to each engagement of said locking element with said keeper, (n) said stop element being provided with resilient shock absorbing means for absorbing the shock effected on stopping movement of said table, and (o) said coacting means means comprising means successively in order operating said second mentioned actuating means to disengage said locking element from said keeper slot, operating said first mentioned actuating means to actuate said arcuate arm and rotate said table to a next working position, operating said second mentioned actuating means to engage said locking element with a next keeper slot, and operating said first mentioned actuating means to actuate said arm to a position engaging the means carried thereby with a next indexing slot.

6. A rotary index table mechanism comprising
(a) a support,
(b) a table rotatably carried by said support and having a plurality of annularly spaced indexing slots disposed at equal radii from the axis of table rotation,
(c) an arcuate arm movably carried by said support,
(d) means guiding said arm for movement in an arc concentric with said axis of table rotation,
(e) actuating means arcuately reciprocating said arm,
(f) means carried by said arm and operably engageable with said table whereby to rotate said table to successive working positions,
(g) said table having a plurality of annularly spaced keeper slots disposed at equal radii from the axis of table rotation,
(h) a locking element movably carried by said support,
(i) actuating means intermittently operating said locking element to engage same with successive keeper slots to lock said table in said successive working positions,
(j) means coacting with both of said actuating means and operable to effect disengagement of said locking element prior to each rotating movement of said table and
(k) a stop element carried by said support,
(l) means resiliently urging said stop element into one of said indexing slots on each rotating movement of said table to stop said table movement,
(m) means provided on said arcuate arm and releasing said stop element from said indexing slot subsequent to each engagement of said locking element with said keeper,
(n) said stop element being provided with resilient shock absorbing means for absorbing the shock effected on stopping movement of said table, and
(o) said first mentioned actuating means comprising a fluid cylinder carried by said support and having a piston and link element operably connected with said arcuate arm,
(p) said second mentioned actuating means comprising a fluid cylinder carried by said support and having a piston operably connected with said locking element, and
(q) said coacting means comprising a first control valve operating said first mentioned cylinder and piston and a second control operating said second mentioned cylinder and piston,
(r) said second control valve initially operating said second mentioned piston to a position disengaging said locking element from said keeper slot,
(s) said first control valve having means operably engaged by said locking element only on disengagement thereof from said keeper slot to operate said first mentioned piston to move said arm and thereby rotate said table to a next successive working position,
(t) said second control valve having means operably engaged by said link element only when said table movement is completed to operate said second mentioned piston to a position engaging said locking element with the next successive keeper slot, and
(u) fluid pressure means connected with said cylinders and controlled by said control valves.

7. A rotary index table mechanism comprising
(a) a support,
(b) a table rotatably carried by said support and having a plurality of annularly spaced indexing slots disposed at equal radii from the axis of table rotating,
(c) an arcuate arm movably carried by said support,
(d) means guiding said arm for movement in an arc concentric with said axis of table rotation,
(e) actuating means arcuately reciprocating said arm,
(f) means carried by said arm and operably engageable with said table whereby to rotate said table to successive working positions,
(g) said table having a plurality of annularly spaced keeper slots disposed at equal radii from the axis of table rotation,
(h) a locking element movably carried by said support,
(i) actuating means intermittently operating said locking element to engage same with successive keeper slots to lock said table in said successive working positions,
(j) means coacting with both of said actuating means and operable to effect disengagement of said locking element prior to each rotating movement of said table and to effect engagement of said locking element after each rotating movement of said table,
(k) a stop element carried by said support,
(l) means resiliently urging said stop element into one of said indexing slots on each rotating movement of said table to stop said table movement,
(m) means provided on said arcuate arm and releasing said stop element from said indexing slot subsequent to each engagement of said locking element with said keeper,
(n) said stop element being provided with resilient shock absorbing means for absorbing the shock effected on stopping movement of said table, and
(o) said table having a top surface adapted to support workpieces and a lower surface overlying said support,
(p) said lower surface having an annular recess concentric with the table axis of rotation and provided with inner and outer peripheral edges,
(q) said indexing slots being disposed in one of said edges and said keeper slots being disposed in the other of said edges, and
(r) said locking element, said stop element and said means carried by said arm being disposed substantially within said annular recess.

8. A rotary index table mechanism comprising
(a) a support,
(b) a table rotatably carried by said support and having a plurality of annularly spaced indexing slots disposed at equal radii from the axis of table rotation,
(c) an arcuate arm movably carried by said support,
(d) means guiding said arm for movement in an arc concentric with said axis of table rotation,
(e) actuating means arcuately reciprocating said arm,
(f) means carried by said arm and operably engageable with said table whereby to rotate said table to successive working positions,
(g) said table having a plurality of annularly spaced keeper slots disposed at equal radii from the axis of said table rotation,
(h) a locking element movably carried by said support,
(i) actuating means intermittently operating said locking element to engage same with successive keeper slots to lock said table in said successive working positions,
(j) means coacting with both of said actuating means and operable to effect disengagement of said locking element prior to each rotating movement of said table and to effect engagement of said locking element after each rotating movement of said table,
(k) a stop element carried by said support,
(l) means resiliently urging said stop element into one of said indexing slots on each rotating movement of said table to stop said table movement,
(m) means provided on said arcuate arm and releasing said stop element from said indexing slot subsequent to each engagement of said locking element with said keeper slots, and (n) resilient means carried by said stop element for absorbing the shock of stopping said table.

9. A rotary index table mechanism comprising
(a) a support,
(b) a table rotatably carried by said support and having a plurality of annularly spaced indexing slots disposed at equal radii from the axis of table rotation,
(c) an arcuate arm movably carried by said support,
(d) means actuating said arm for extension and retraction in opposite directions along an arc concentric with the axis of table rotation,
(e) said arm having means engaging said table on extension and operable to rotate said table on retraction,
(f) a stop element carried by said support,
(g) a stop element carried by said support,
(h) means resiliently urging said stop element into one of said indexing slots on each rotating movement of said table to stop said table movement, and
(i) means provided on said arcuate arm and operable to release said stop element from said indexing slot prior to each retraction of said arm.

10. A rotary index table mechanism comprising
(a) a support,
(b) a table rotatably carried by said support,
(c) an arcuate arm movably carried by said support,
(d) means actuating said arm for extension and retraction in opposite directions along an arc concentric with the axis of the table rotation,
(e) said arm having means engaging said table on extension and being operable to rotate said table on retraction,
(f) said last mentioned means disengaging from said table at the start of extension movement,
(g) a second arm pivotally carried by said support,
(h) said second arm having means operably engaging and stopping said table at the termination of rotation thereof and preventing further rotation,
(i) said second arm being provided with resilient shock absorbing means for absorbing the shock effected on stopping movement of said table, and
(j) means provided on said first mentioned arm and releasing said second arm from stopping engagement with said table during extension of said first mentioned arm.

References Cited in the file of this patent
UNITED STATES PATENTS

| | | |
|---|---|---|
| 2,392,964 | Armitage et al. | Jan. 15, 1946 |
| 2,549,746 | Kylin et al. | Apr. 17, 1951 |
| 2,660,895 | Waters | Dec. 1, 1953 |
| 2,968,973 | Mead | Jan. 24, 1961 |

FOREIGN PATENTS

| | | |
|---|---|---|
| 638,553 | Germany | Nov. 19, 1936 |
| 768,039 | Great Britain | Feb. 13, 1957 |